Feb. 21, 1956    J. M. CLAYDON    2,735,426
FOAM RUBBER SHEET MATERIAL
Filed Dec. 24, 1953
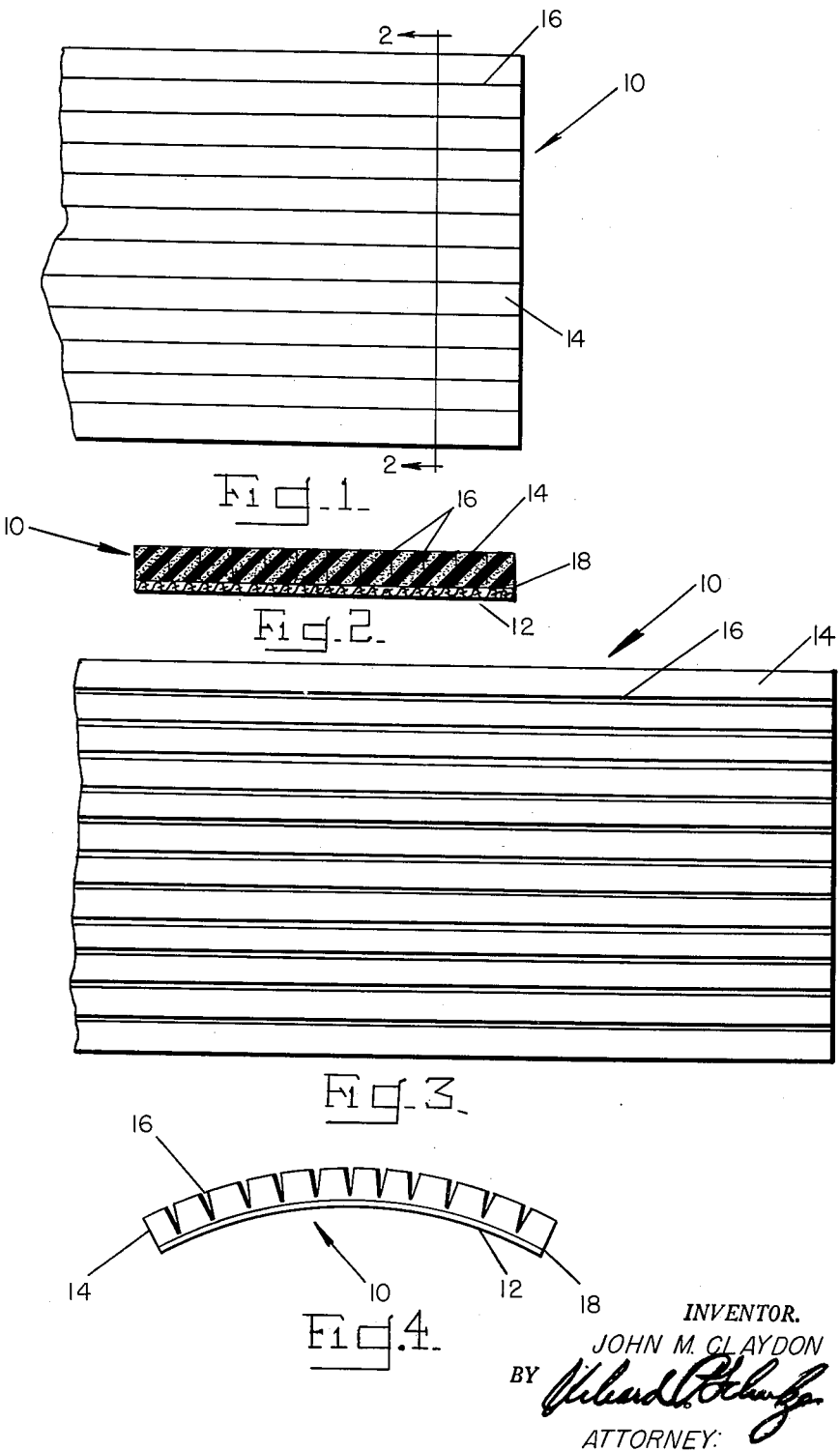
INVENTOR.
JOHN M. CLAYDON
BY
ATTORNEY:

United States Patent Office 2,735,426
Patented Feb. 21, 1956

2,735,426

FOAM RUBBER SHEET MATERIAL

John Mitchell Claydon, Trumbull, Conn., assignor to Connecticut Bandage Mills, Inc., Bridgeport, Conn., a corporation of Connecticut Application December 24, 1953, Serial No. 400,163

11 Claims. (Cl. 128—156)

This invention relates to improvements in laminated sheet material and is concerned particularly with bandage material.

Foam rubber, both with and without association with a fabric backing material, has heretofore been used for surgical bandaging purposes and possesses many recognized advantages over the usual fabric bandage material alone. One serious disadvantage, however, has been the tendency of the foam rubber to narrow when it is stretched so that the member to which it is applied is often inadequately or improperly covered.

The primary object of the present invention is to avoid the foregoing and other disadvantages of materials heretofore used and to provide a novel foam rubber bandage material which is non-narrowing and which will retain substantially the same width whether in stretched or in normal condition.

With the aforesaid objective in view, the invention contemplates the provision of a plurality of slits in the foam rubber so disposed as to spread when the sheet is subjected to stretching whereby substantially to compensate for narrowing transversely of the direction of stretch which normally would result.

A further object of the invention is to provide a foam rubber bandage material which has greater porosity or absorbent properties than the plain surface sheet material heretofore used.

Another object is to provide a bandage material of increased pliability which readily conforms to configurations to which it is applied and which enables its efficient application to concave surfaces, for example.

It is also an object of the invention to provide a bandage material which possesses an increased frictional contact surface and hence greater gripping ability.

Other and further objects and advantages will be apparent from the following detailed explanation taken in conjunction with the accompanying drawing wherein a preferred embodiment of the principles of the invention has been selected for exemplification.

In the drawings:

Fig. 1 is a fragmentary plan view of a laminated sheet or strip of bandage material constructed in accordance with the present invention and shown in unstretched or normal condition;

Fig. 2 is a sectional view taken on the line 2—2 of Fig. 1;

Fig. 3 is a view similar to Fig. 1 of the same fragment shown in Fig. 1 but in stretched condition; and Fig. 4 is an end view of the material shown in Fig. 1 as bent in convex form.

Referring more particularly to the drawings, wherein like numerals refer to like parts, the fragment of material designated in its entirety by the numeral 10 may be in sheet form of any desired size or, as in a preferred embodiment of the invention, in the form of elongated strips of bandage material which may be wrapped around a body member and cut off in any desired lengths. Ordinary surgical bandage material is usually provided in widths of two, two and one-half, three, four, five and six inches and the bandage material of the present invention may also be provided, if desired, in these same widths.

The material shown at 10 is formed from a fabric backing layer 12 which is preferably woven to have a one-way stretch in the direction of its length. The fabric layer 12 may be an all-cotton or rubber reinforced all-cotton elastic bandage material conventionally used as surgical bandages or the like. The foam rubber face layer 14 is secured to the backing layer 12 by adhesion or vulcanization. In some cases, the fabric backing layer 12 may be omitted and the novelly constructed foam rubber layer 14 may be employed alone if desired or in combination with other backing material. The thickness of the foam rubber layer 14 may vary as desired, for example, one-eighth inch, one-half inch or the one-quarter inch thickness shown. The foam rubber material as contemplated by the invention may be the conventional cellular material with inter-communicating cells formed from rubber latex and having a porous character or liquid absorbing properties. Such material often carries a surface rubber curing skin which would tend to reduce the surface porosity of the material but, in accordance with the present invention, this curing skin may be retained, if desired, without interfering materially with the absorbing function of the layer.

Now, ordinary foam rubber when subjected to stretch in one direction narrows in the transverse direction as the result of elongation and transverse restriction of its component rubber globules. The provision of a non-narrowing or one-way stretchable fabric backing for the foam rubber layer does not ordinarily offer sufficient resistance to such narrowing so that any such composite bandage material deforms when in use to an objectionable or even inoperable extent.

To compensate for such narrowing, the present invention provides for a plurality of slits or cuts in the body portion of the foam rubber layer 14, preferably extending lengthwise thereof or in the direction of stretch to be expected, to provide in effect a series of contiguous elongated strips. Such cuts, as shown at 16, extend from the outer face of the layer 14 toward its inner face and preferably terminate short thereof a slight distance so that a continuous inner face 18 is provided for more secure junction with the fabric layer 12. The elongated slits 16 may be provided in any number suitable for the purposes intended. In the device illustrated the cuts are spaced apart approximately one-quarter of an inch but it is to be understood that they may be uniformly or variably disposed in any spacings desired.

The function of the slits or grooves 16 is best illustrated in Figs. 3 and 4. As shown in Fig. 3, when the material 10 is stretched, the cut portions collectively spread distances approximately sufficient to compensate for the amount of narrowing which would result if a similar body of uncut foam rubber were similarly stretched thereby to maintain the material 10 in approximately uniform width when in both stretched and normal positions. As an additional advantage, the slits 16 provide greater frictional contact and better gripping ability when the foam rubber layer 14 is placed in contact, for example, with a portion of the human body as a bandage. As a further advantage, the surface area increase caused by the spread slits 16 renders the foam rubber 14 more absorbent particularly so, since the exposed sides of the slits 16 are bare of the curing skin usually present on the outer surface of foam rubber which tends to reduce porosity. The surface area which is added when the foam rubber layer 14 is stretched is accordingly composed of open body globules and the absorbent properties of the material are therefor increased in far greater degree than by a similar addition of normal surface area.

The provision of the slits 16 also renders the material 10, whether stretched or not, more pliable and flexible. As indicated in Fig. 4, the material 10 is thus ideally adapted for use against concave bodies, for example as an arm pit or knee pit bandage, and when used in this manner is not subject to the usual deformation inherent in other bandage materials. It will be apparent from Fig. 4 that when the material 10 is thus convexly curved the slits 16 become spread thereby to increase the surface area and absorbent properties of the material in about the same manner as when it is stretched.

When the material 10 is to be employed as a bandaging material, the same or the foam rubber portion 14 thereof may, if desired, be coated or impregnated with any suitable medicinal or antiseptic preparation and provided in either a dry or a moist condition. In some cases, particularly where a wet antiseptic foam dressing is to be provided, it may be desirable to embody in the material 10 an impervious outer or intermediate layer.

The novel material as herein illustrated and above described is exemplary only of a preferred form of the present invention which embraces various other modified structures and arrangement of parts as provided for by the scope of the following claims.

I claim:

1. Bandage material comprising, a one-way stretchable fabric backing and a foam rubber surface layer, the said foam rubber surface layer being provided with a surface slit.

2. Bandage material comprising, a one-way stretchable fabric backing and a foam rubber surface layer, the said foam rubber surface layer being provided with a plurality of surface slits.

3. Bandage material comprising, a one-way stretchable fabric backing and a foam rubber surface layer, the said foam rubber surface layer being provided with a surface slit disposed substantially in the stretchable direction of the fabric backing.

4. Bandage material comprising a one-way stretchable fabric backing and a foam rubber surface layer, the said foam rubber surface layer being provided with a plurality of surface slits disposed substantially in the stretchable direction of the fabric backing.

5. Bandage material comprising, a one-way stretchable fabric backing and a foam rubber surface layer, the said foam rubber surface layer being provided with a surface slit, the said slit terminating short of the opposed surface of the foam rubber layer whereby to provide a continuous inner surface for contact with said fabric backing.

6. Bandage material comprising, a one-way stretchable fabric backing and a foam rubber surface layer, the said foam rubber surface layer being provided with a plurality of surface slits, the said slits terminating short of the opposed surface of the foam rubber layer whereby to provide a continuous inner surface for contact with said fabric backing.

7. Bandage material comprising, a one-way stretchable fabric backing and a foam rubber surface layer, the said foam rubber surface layer being provided with a surface slit disposed substantially in the stretchable direction of the fabric backing, the said slit terminating short of the opposed surface of the foam rubber layer whereby to provide a continuous inner surface for contact with said fabric backing.

8. Bandage material comprising, a one-way stretchable fabric backing and a foam rubber surface layer, the said foam rubber surface layer being provided with a plurality of surface slits disposed substantially in the stretchable direction of the fabric backing, the said slits terminating short of the opposed surface of the foam rubber layer whereby to provide a continuous inner surface for contact with said fabric backing.

9. Bandage material comprising, a stretchable backing material and a foam rubber surface layer in the form of contiguous elongated strips spreadable when the bandage material is stretched to expose the side portions of said strips.

10. Bandage material comprising, a one-way stretchable fabric backing and a foam rubber surface layer contiguous with said fabric backing, the said foam rubber surface layer being provided with a surface slit disposed substantially in the stretchable direction of the fabric backing.

11. Bandage material comprising, a one-way stretchable fabric backing and a foam rubber surface layer contiguous with said fabric backing, the said foam rubber surface layer being provided with a plurality of surface slits disposed substantially in the stretchable direction of the fabric backing, the said slits terminating short of the opposed surface of the foam rubber layer whereby to provide a continuous inner surface for contact with said fabric backing.

References Cited in the file of this patent

UNITED STATES PATENTS

| | | |
|---|---|---|
| 578,527 | Scotford | Mar. 9, 1897 |
| 2,078,243 | Harnly | Apr. 27, 1937 |
| 2,258,720 | Saighman | Oct. 14, 1941 |
| 2,579,545 | Cadous | Dec. 25, 1951 |
| 2,687,723 | Stern | Aug. 31, 1954 |

FOREIGN PATENTS

| | | |
|---|---|---|
| 417,187 | Great Britain | Oct. 1, 1934 |